United States Patent
Thomas

(10) Patent No.: US 9,417,634 B2
(45) Date of Patent: Aug. 16, 2016

(54) FLOW REGULATION IN AIRCRAFT SYSTEMS

(75) Inventor: Glynn Michael Thomas, Stafford (GB)

(73) Assignee: MOOG WOLVERHAMPTON LIMITED, Wolverhampton West Midlands (GB)

(*) Notice: Subject to any disclaimer, the term of this patent is extended or adjusted under 35 U.S.C. 154(b) by 726 days.

(21) Appl. No.: 13/394,421

(22) PCT Filed: Aug. 25, 2010

(86) PCT No.: PCT/GB2010/051400
§ 371 (c)(1),
(2), (4) Date: Mar. 6, 2012

(87) PCT Pub. No.: WO2011/033279
PCT Pub. Date: Mar. 24, 2011

(65) Prior Publication Data
US 2012/0168560 A1 Jul. 5, 2012

(30) Foreign Application Priority Data
Sep. 16, 2009 (GB) .................................. 0916252.0

(51) Int. Cl.
G05D 7/01 (2006.01)

(52) U.S. Cl.
CPC .......... *G05D 7/0133* (2013.01); *Y10T 137/7784* (2015.04); *Y10T 137/7808* (2015.04); *Y10T 137/85986* (2015.04); *Y10T 137/8671* (2015.04)

(58) Field of Classification Search
CPC ....... F16K 17/28; F16K 17/30; G05D 16/103; G05D 7/0133; Y10T 137/7784; Y10T 137/7785; Y10T 137/7796; Y10T 137/7797; Y10T 137/7798; Y10T 137/7793; Y10T 137/7808; Y10T 137/7835

USPC .......... 137/497, 498, 505.13, 505.14, 505.15, 137/505, 505.25, 509
See application file for complete search history.

(56) References Cited

U.S. PATENT DOCUMENTS 2,745,430 A * 5/1956 Slomer .................... 137/505.13
3,593,575 A 7/1971 Thieme
(Continued)

FOREIGN PATENT DOCUMENTS

| GB | 735640 A | 8/1955 |
|----|----------|--------|
| GB | 1306679 A | 2/1973 |

(Continued)

OTHER PUBLICATIONS

United Kingdom Intellectual Property Office, Search Report under Section 17(5) mailed Dec. 15, 2009 in corresponding U.K. Application No. GB0916252.0.

(Continued)

*Primary Examiner* — Michael R Reid
(74) *Attorney, Agent, or Firm* — Hodgson Russ LLP

(57) ABSTRACT

The present invention relates generally to flow regulation in aircraft systems. More particularly, the present invention relates to a flow regulator 100 and a high-lift system 200 for an aircraft incorporating such a flow regulator 100. The flow regulator 100 comprises a fluid input port 102 for receiving a pressurized fluid, a fluid output port 104 for providing fluid having a regulated flow rate, and a regulator valve 106 connected in fluid communication between the fluid input port 102 and the fluid output port 104. The regulator valve 106 is operable to provide regulated fluid at a substantially constant output flow rate to the fluid output port 104. The flow regulator 100 also includes a flow switching mechanism 108 for switching the substantially constant output flow of the flow regulated fluid provided by the regulator valve 106 between a first flow rate and a second flow rate, the first flow rate being less than the second flow rate.

4 Claims, 4 Drawing Sheets

(56) References Cited

U.S. PATENT DOCUMENTS

| | | | |
|---|---|---|---|
| 3,675,678 A * | 7/1972 | Lamping | 137/505.22 |
| 3,995,656 A * | 12/1976 | Mills, Jr. | 137/497 |
| 4,074,693 A | 2/1978 | Kates | |
| 4,415,001 A * | 11/1983 | Kent | 137/497 |
| 2004/0154672 A1 | 8/2004 | Liberfarb | |
| 2007/0199601 A1 | 8/2007 | Imhof | |

FOREIGN PATENT DOCUMENTS

| | | |
|---|---|---|
| GB | 1424471 A | 2/1976 |
| GB | 1445082 A | 8/1976 |
| GB | 2391057 A | 1/2004 |
| WO | 2008/052553 A1 | 5/2008 |

OTHER PUBLICATIONS

WIPO, International Searching Authority ISA/EP, International Search Report issued Nov. 16, 2010 in International Application No. PCT/GB2010/051400.

WIPO, International Searching Authority ISA/EP, Written Opinion of the International Searching Authority issued Nov. 16, 2010 in International Application No. PCT/GB2010/051400.

* cited by examiner

FLOW REGULATION IN AIRCRAFT SYSTEMS

FIELD

The present invention relates generally to flow regulation in aircraft systems. More particularly, the present invention relates to a fluid flow regulator and a high-lift system (HLS) for an aircraft incorporating such a flow regulator.

BACKGROUND

For various applications it is known to provide fluid regulators to provide a substantially constant fluid flow at an output port [1].

However, many such conventional fluid regulators are limited in their application, for example, when used in the highly demanding and regulated field of aircraft systems such as in a high-lift system that may control leading edge slats and trailing edge flaps on an aircraft wing, not least because such devices operate to regulate fluid flow to a single predetermined value.

SUMMARY

The present invention has thus been devised whilst bearing the aforementioned drawbacks associated with conventional fluid regulators in mind.

According to a first aspect of the present invention, there is provided a flow regulator for an aircraft. The flow regulator comprises a fluid input port for receiving a high pressure fluid and a fluid output port for providing fluid having a regulated flow. The flow regulator also comprises a regulator valve connected in fluid communication between the fluid input port and the fluid output port. The regulator valve is operable to provide regulated fluid at a substantially constant output flow rate to the fluid output port. Additionally, the flow regulator comprises a flow switching mechanism for switching the substantially constant output flow of the regulated fluid provided by the regulator valve between a first flow rate and a second flow rate, wherein the first flow rate is less than the second flow rate.

According to a second aspect of the present invention, there is provided a hydraulic control circuit for an aircraft including a flow regulator in accordance with the first aspect of the present invention. The hydraulic control circuit may, for example, be used in a high lift system (HLS) of an aircraft. Various embodiments of such a HLS provide improved reliability, reduced weight and a simplified architecture when compared to conventional high lift systems.

According to a third aspect of the present invention, there is provided an adapter module for retrofitting to an existing flow regulator of an aircraft. The adapter module is configured to provide the regulator with a switchable regulated fluid flow output. The adapter module comprises a flow switching mechanism for switching a substantially constant output of regulated fluid flow provided by a regulator valve between a first flow rate and a second flow rate, wherein the first flow rate is less than the second flow rate. Such an adapter module may, for example, be used when providing an embodiment of the aforementioned HLS.

BRIEF DESCRIPTION OF THE DRAWINGS

Various aspects and embodiments of the present invention will now be described in connection with the accompanying drawings, in which.

DETAILED DESCRIPTION

Figure 1:
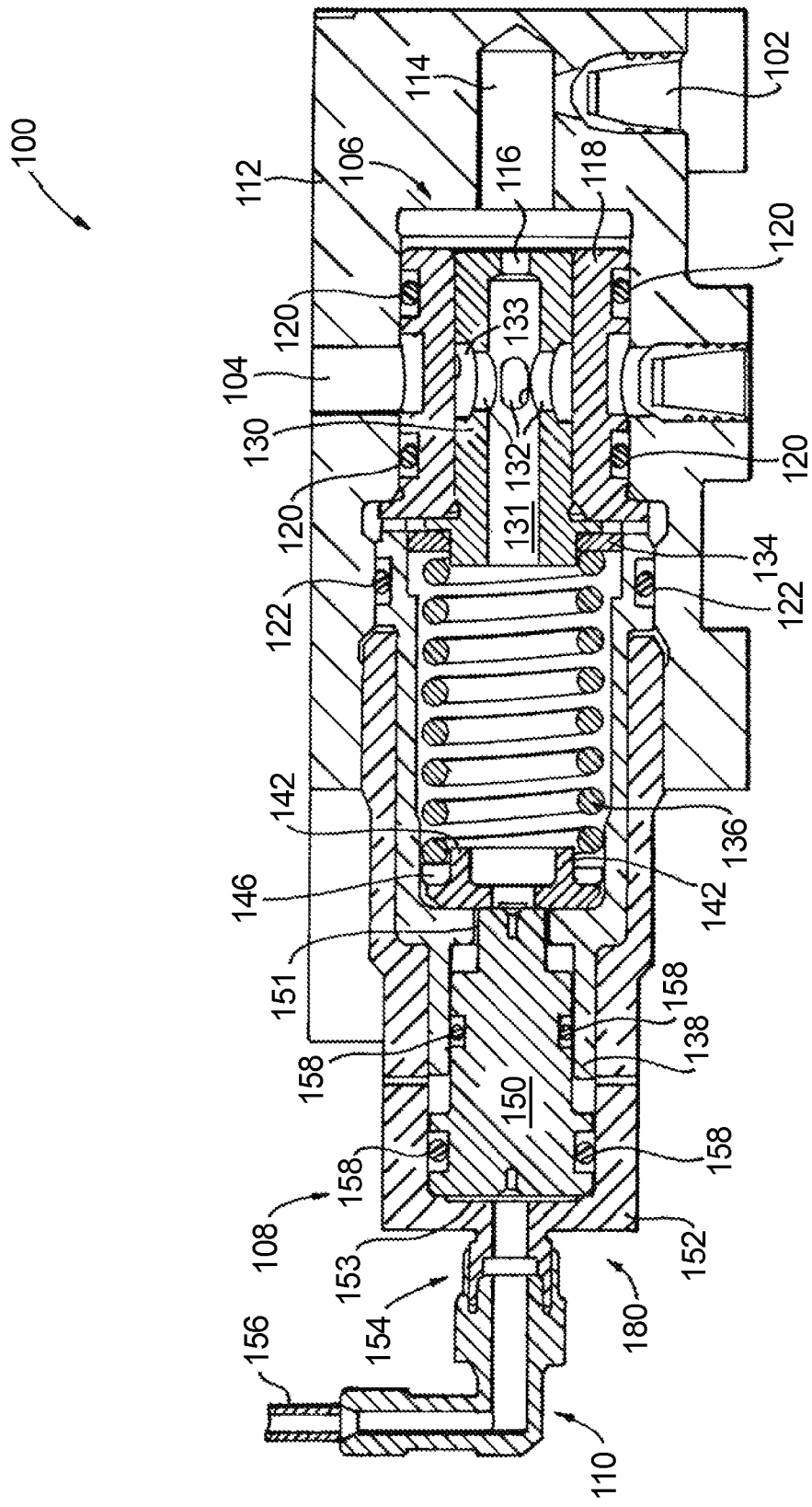
FIG. 1 shows a flow regulator for an aircraft in accordance with an embodiment of the present invention.

FIG. 1 shows a flow regulator 100 for an aircraft in accordance with an embodiment of the present invention. The flow regulator 100 comprises a fluid input port 102 for receiving a pressurised fluid and a fluid output port 104 for providing fluid having a regulated flow. A regulator valve 106 is connected in fluid communication between the fluid input port 102 and the fluid output port 104. The regulator valve 106 is operable to provide flow regulated fluid at a substantially constant output flow rate to the fluid output port 104.

The flow regulator 100 also comprises a flow switching mechanism 108 for switching the substantially constant output flow of the flow regulated fluid provided by the regulator valve 106 between a first flow rate and a second flow rate. The first flow rate and the second flow rate are different. The flow switching mechanism 108 of this embodiment is a bi-stable device that is switchable between a fixed predetermined first flow rate and a fixed predetermined second flow rate. Such a bi-stable state device allows for the use of simple binary control logic having an on/off state output and is also inherently reliable in operation.

The flow switching mechanism 108 may be operated by various means. For example, electrically (e.g. solenoid activated), pneumatically, etc., although it is preferably hydraulically activated. In this embodiment, remote hydraulic activation is provided via a hydraulic control coupling 110 connected to the flow switching mechanism 108.

Figure 2:
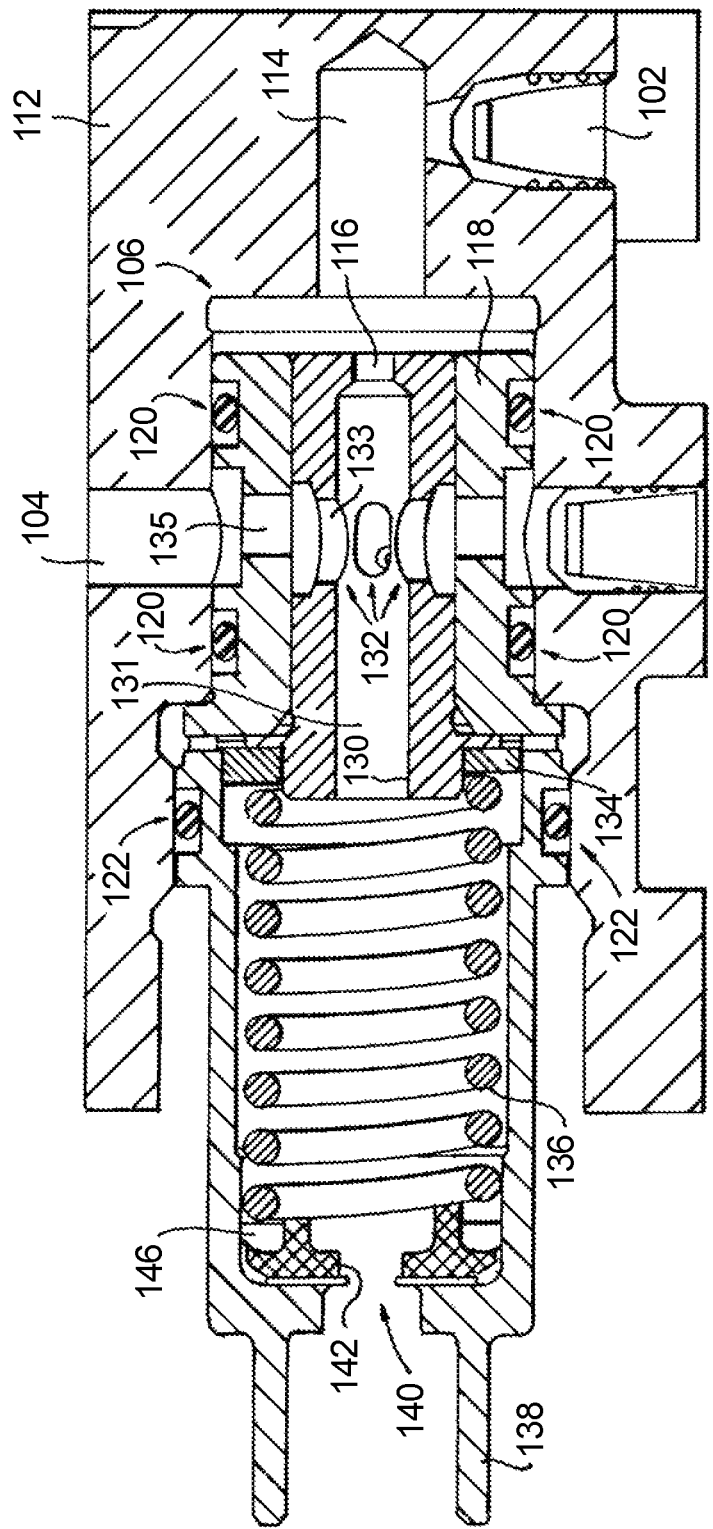
FIG. 2 shows a first part of the flow regulator shown in FIG. 1.

FIG. 2 shows a first part of the flow regulator 100 shown in FIG. 1. The regulator valve 106 is provided within regulator valve housing 112. The regulator valve housing 112 also has the fluid input port 102 and the fluid output port 104 provided therein. The fluid input port 102 and the fluid output port 104 may include conventional hydraulic connectors (not shown) to enable respective hydraulic hoses (not shown) to be coupled thereto. An input fluid chamber 114 is provided in the regulator valve housing 112. The input fluid chamber 114 connects the fluid input port 102 to the regulator valve 106. The regulator valve 106 is mounted to the regulator valve housing 112 by way of an end cap 152. Seals 120 prevent fluid leakage from the input fluid chamber 114 to the fluid output port 104.

The regulator valve 106 is formed of a slidable spool 130 mounted in a sleeve 118. The spool 130 has a hollow bore that is in fluid communication with the input fluid chamber 114 via a constant restrictor 116 provided in the spool 130. The constant restrictor 116 provides a pressure drop between the input fluid chamber 114 and the valve chamber 131. The load balance on the spool 130 depends upon the pressure force pushing to the left from input fluid chamber 114, the pressure force pushing to the right from the valve chamber 131 and the force generated by the biasing mechanism 136 pushing right. When the flow tries to increase above a set point, it is "sensed" by the constant restrictor 116 in as far as the pressure difference between the input fluid chamber 114 and the valve chamber 131 ensures that the net pressure force on the spool 130 is greater than the force applied by the biasing mechanism 136 such that the spool 130 starts to move left. As the spool 130 moves left it starts to close off sleeve exit ports 135, thereby introducing extra pressure drop that in turn controls the flow in the flow regulator 100.

Four radially extending apertures 132 are also provided in the spool 130. These apertures 132 allow fluid from the valve chamber 131 to flow into an annular cavity 133 provided between the spool 130 and the sleeve 118. Radially extending sleeve exit ports 135 are provided to connect the annular cavity 133 to the fluid output port 104. The sleeve exit ports 135 are open or closed to varying degrees, depending upon the relative position of the spool 130 within the sleeve 118. Thus the lateral position of the spool 130 in the sleeve 118 dictates the amount of fluid that can flow from the fluid input port 102 to the fluid output port 104.

Also provided in the regulator valve 106 is a compression adjuster 140 for applying a resilient biasing force to the spool 130. The biasing force generated by the compression adjuster 140 tends to push the spool 130 towards the input fluid chamber 114, in which position the sleeve exit ports 135 are fully open to enable a maximal fluid flow between the fluid input port 102 and the fluid output port 104 to be obtained.

The compression adjuster 140 is provided in a biasing mechanism housing 138 that is connected to the regulator valve housing 112 by way of an end cap 152. A seal 122 provides a fluid seal to the outside environment. The compression adjuster 140 includes a biasing mechanism 136 which in this embodiment is formed from a helical spring. A ring-shaped first collar 134 is provided about the spool 130 and abuts a shoulder portion thereof. The helical spring bears onto the first collar 134 such that the first collar 134 transmits the resilient biasing force from the helical spring to the spool 130.

The compression adjuster 140 additionally comprises a translatable cap 142 provided in a bore of the biasing mechanism housing 138. The cap 142 is resiliently biased by the biasing mechanism 136 against a shoulder portion of the biasing mechanism housing 138 distal from the first collar 134. A second collar 146 is also provided for transferring the resilient biasing force provided by the helical spring to the cap 142. The size of the first collar 134 and/or second collar 146 may be adjusted during assembly to set the biasing level that is applied by the biasing mechanism 136. Application of a control force to the cap 142 may thus be used to adjust the compression of the helical spring forming the biasing mechanism 136, and in turn the flow of regulated fluid that will be provided at the fluid output port 104 by the regulator valve 106.

Figure 3:
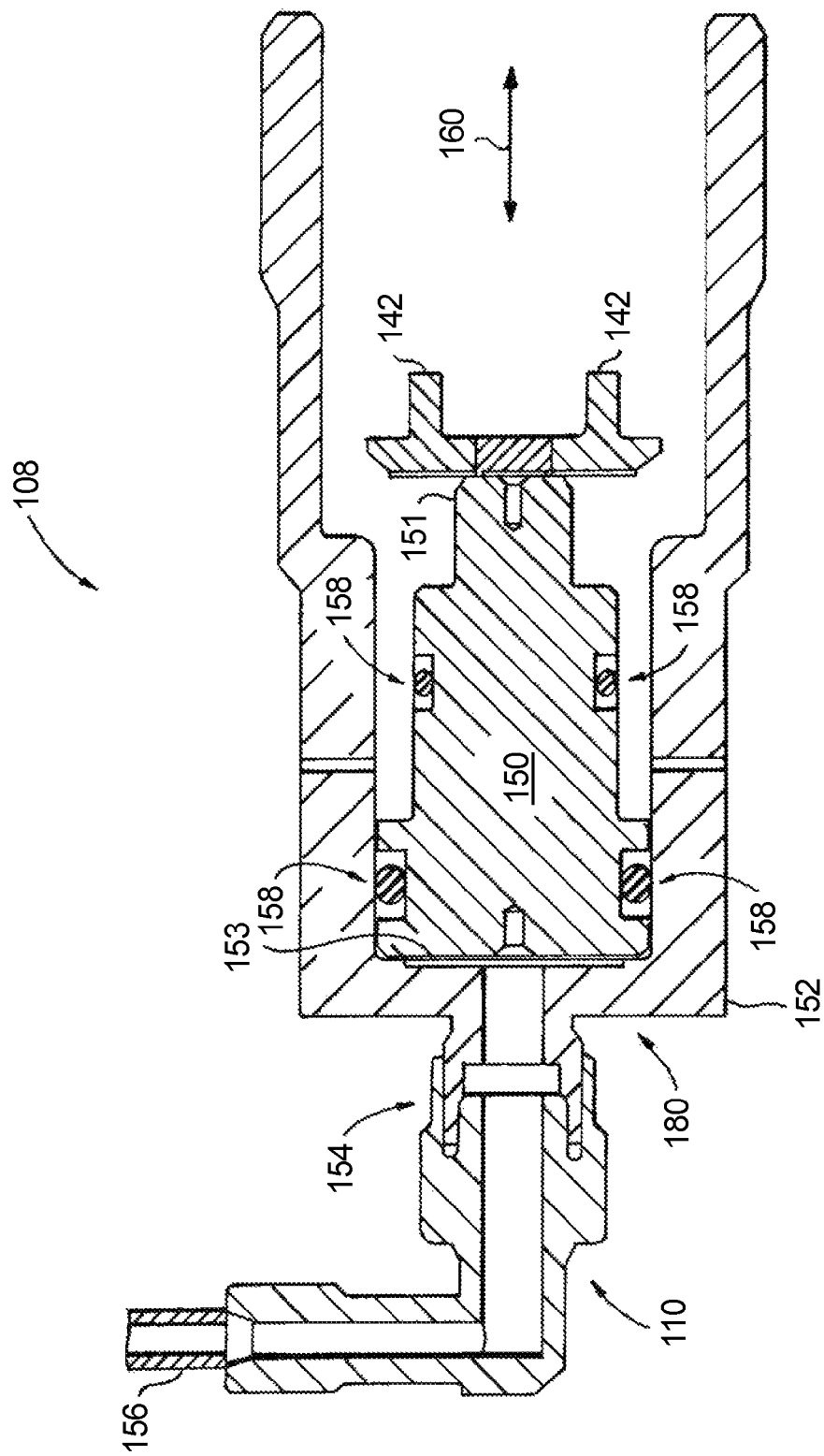
FIG. 3 shows a second part of the flow regulator shown in FIG. 1.

FIG. 3 shows a second part of the flow regulator 100 shown in FIG. 1. FIG. 3 shows in greater detail the flow switching mechanism 108 coupled to cap 142 and the hydraulic control coupling 110. The flow switching mechanism 108 comprises an actuable piston 150 slidably mounted in a flow switching mechanism housing 152, such that the piston 150 can move relative to the flow switching mechanism housing 152 in the directions of arrow 160. The piston 150 is mounted in a central bore of the flow switching mechanism housing 152. Seals 158 are also provided to prevent fluid leakage.

A first end 151 of the piston 150 is shaped and sized to enable it to pass through the shoulder portion of the biasing mechanism housing 138. The first end 151 also abuts the cap 142. In operation, fluid pressure acts upon the second end 153 of the piston 150 to move the piston 150 in the flow switching mechanism housing 152.

The second end 153 of the piston 150 in fluid communication with a conventional hydraulic line connector 154, through which pressurised fluid may be supplied via the hydraulic control coupling 110 from a hydraulic line 156 in order to actuate the flow switching mechanism 108. Such pressurised fluid can thus be used to actuate the piston 150 which in turn applies a bias adjusting force to the biasing mechanism 136 to control the flow rate of fluid provided by the fluid output port 104.

In this embodiment, the flow switching mechanism 108 (including the flow switching mechanism housing 152, the piston 150, the seals 158 and connector 154) are provided as an adapter module 180 that can directly replace the corresponding end part of a conventional aircraft flow regulator. This provides for retrofitting for converting a standard regulator to a multiple output flow rate device without replacement of the entire standard regulator or valve manifold. For example, the flow switching mechanism housing 152 may be provided as a releasable end cap for coupling to a know regulator valve, e.g. of the type to be provided by GE and used in various high-lift systems.

Figure 4:
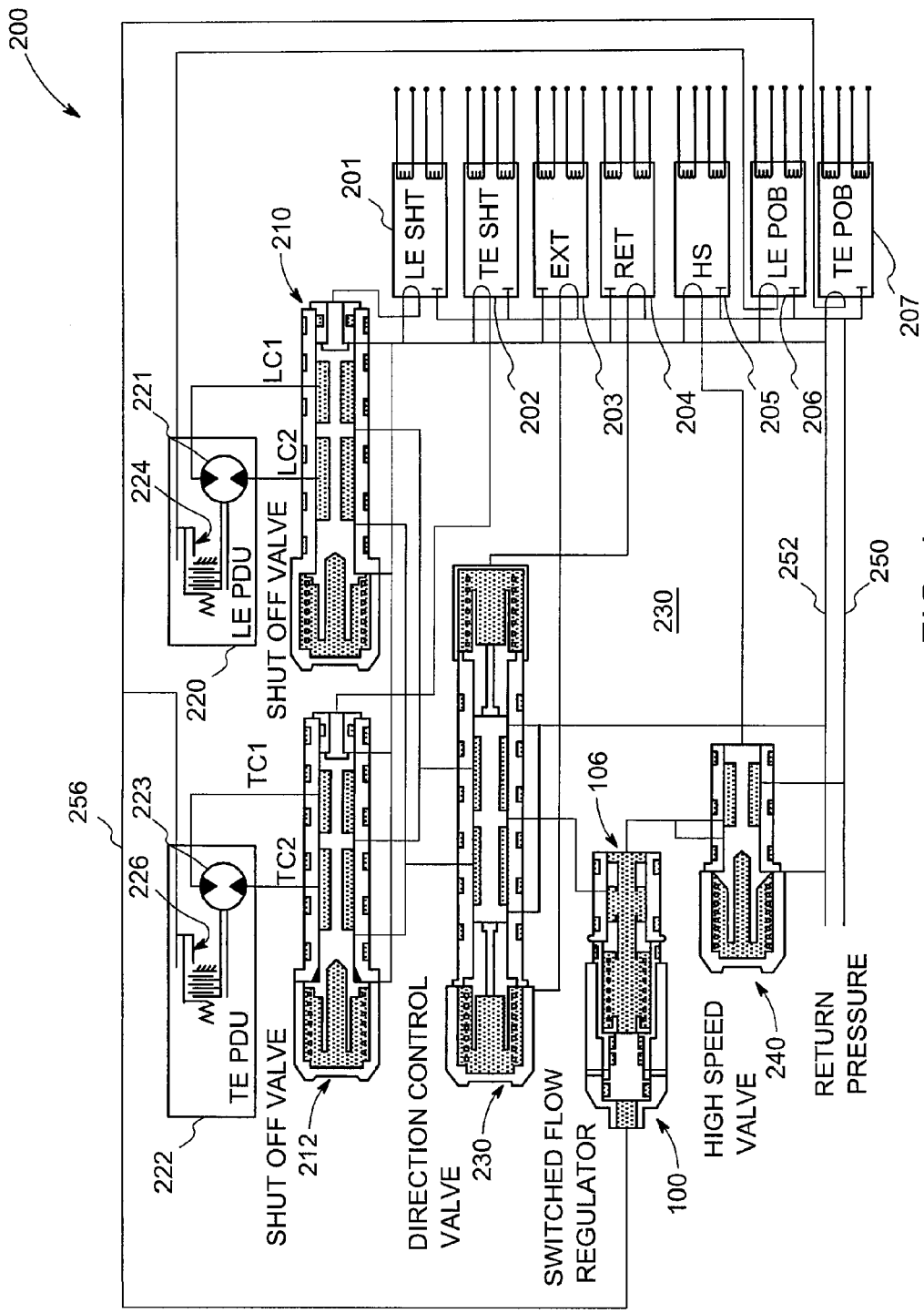
FIG. 4 shows a hydraulic control circuit in accordance with an embodiment of the present invention.

FIG. 4 shows a hydraulic control circuit 200 for an aircraft high lift system in accordance with an embodiment of the present invention. The hydraulic control circuit 200 includes at least one switched flow regulator 100.

The hydraulic control circuit 200 includes a leading edge driver device unit 220 for driving one or more leading edge slats (not shown) and a trailing edge driver device unit 222 for driving one or more flap panels (not shown). The leading edge driver device unit 220 includes a first hydraulic motor 221 and a first brake 224 for respectively driving and arresting movement of the leading edge slats. The trailing edge driver device unit 222 includes a second hydraulic motor 223 and a second brake 226 for respectively driving and arresting movement of the flap panels.

The brakes 224, 226 and the hydraulic motors 221, 223 are driven by a hydraulic supply system 230. Pressurised hydraulic fluid enters the hydraulic supply system 230 through a pressure line 250 and exits the hydraulic supply system 230 through a return line 252.

Pressure line 250 connects directly to a leading edge solenoid flow valve (SFV) 201, a trailing edge SFV 202, a high-speed SFV 205, a leading edge brake SFV 206 and a trailing edge brake SFV 207. The pressure line 250 also provides hydraulic power to both directional valve chambers of a direction control valve 230. The SFV's may be controlled electronically by a conventional HLS controller (not shown).

Leading edge hydraulic motor 221 is controlled by a first shut-off valve 210. The first shut-off valve 210 is in turn controlled by the leading edge SFV 201. Trailing edge hydraulic motor 223 is controlled by a second shut-off valve 212. The second shut-off valve 212 is in turn controlled by the trailing edge SFV 202. Either the leading edge hydraulic motor 221 or the trailing edge hydraulic motor 223 is operated at any one time, they do not operate simultaneously.

A direction control valve 230 controls the direction of rotation of the hydraulic motors 221, 223 to either extend or retract the slats or flaps in dependence upon the setting of an extend SFV 203 and a retract SFV 204.

Pressurised fluid for driving the hydraulic motors 221, 223 is provided in the first instance from the pressure line 250 through a high speed valve 240 controlled by the high speed SFV 205. The pressurised fluid passes through the switched flow regulator 100 and then through the direction control valve 230 before being distributed to respective hydraulic motors 221, 223 by the shut-off valves 210, 212. Reduced pressure fluid from the hydraulic motors 221, 223 is fed back into the hydraulic supply system 230 through the return line 252.

The hydraulic supply system 230 incorporates a switched flow regulator control line 256 directly connected to the trailing edge brake 226. In operation, activation of the trailing edge brake SFV 207 simultaneously activates both the trailing edge brake 226 and the flow regulator 100 to toggle the flow rate of the regulated fluid provided by the regulator valve 106 between a first flow rate and a second flow rate. This is advantageous as it simplifies the architecture of the hydraulic supply system 230 by giving dual functionality to single switch, in this case the trailing edge brake SFV 207. Additionally, this design avoids the need to provide dual separate flow regulators to operate individually hydraulic motors for leading and trailing edges that usually require different hydraulic flow rates. Thus such a high-lift system also has a reduced weight and increased reliability when compared to a conventional HLS.

In various aspects and embodiments of the present invention, switching of the flow rate between first and second levels can be achieved without adding further control features to various known existing systems (e.g. known hydraulic control circuits, high lift systems, etc.) One such existing system is provided with solenoids which release pressure off brakes depending upon which motor is to be operated. One such solenoid may thus also be used to control the pressure to a control port of a flow regulator (of the new type described herein), so that whenever the motor is operating (i.e. the brake is released) the flow regulator is automatically controlled by switching its output to the desired flow rate.

Whilst the present invention has been described in relation to various example embodiments, those skilled in the art will be aware that many different variants are possible that also embody the essence of the present invention. Such variants are intended to fall within the scope of the appended claims.

REFERENCE

1. WO 2009/038945 (TESCOM CORPORATION)

Where permitted, the content of the above-mentioned reference is hereby also incorporated into this application by reference in their entirety.

The invention claimed is:

1. A flow regulator (100) for an aircraft, comprising:
   a fluid input port (102) for receiving a pressurised fluid;
   a fluid output port (104) for providing fluid having a regulated flow rate;
   a regulator valve (106) connected in fluid communication between the fluid input port (102) and the fluid output port (104), the regulator valve (106) being operable to provide flow regulated fluid at a substantially constant output flow rate to the fluid output port (104); and
   a flow switching mechanism (108) for switching the substantially constant output flow rate of the regulated fluid provided by the regulator valve (106) between a first flow rate and a second flow rate, the first flow rate being less than the second flow rate;
   wherein the flow switching mechanism (108) is a bi-stable device that is switchable between a fixed predetermined first flow rate and a fixed predetermined second flow rate;
   wherein the regulator valve (106) comprises a resiliently biased translatable spool (130) having at least one aperture (132) for providing pressurised fluid from the fluid input port (102) to the fluid output port (104);
   wherein the flow switching mechanism (108) comprises an actuable piston (150) operable to apply a bias adjusting force to a biasing mechanism (136) that is used to bias the translatable spool (130) in position within the regulator valve (106); and
   wherein the translatable spool (130) includes a constant restrictor (116) and a valve chamber (131) in fluid communication with the input port (102) via the constant restrictor (116), wherein the valve chamber (131) is in fluid communication with the at least one aperture (132) and the valve chamber (131) extends through the spool (130) from the constant restrictor (116) through an end of the spool (130).

2. The flow regulator (100) of claim 1, wherein force is applied to the spool (130) in a first direction by pressurized fluid received through the fluid input port (102), and force is applied to the spool in a second direction opposite the first direction by pressurized fluid in the valve chamber (131) and by the biasing mechanism (136).

3. The flow regulator (100) of claim 1, wherein the piston (150) is enclosed in a housing (112, 138, 152) and has a first end and a second end opposite the first end, wherein the first end of the piston abuts the housing to define the first flow rate and the second end of the piston abuts the housing to define the second flow rate.

4. The flow regulator (100) of claim 1, wherein the piston (150) engages the biasing mechanism (136).

* * * * *